(12) United States Patent
Watanabe et al.

(10) Patent No.: US 6,963,436 B2
(45) Date of Patent: Nov. 8, 2005

(54) METHOD AND DEVICE FOR WAVEFORM SHAPING OF SIGNAL LIGHT

(75) Inventors: Shigeki Watanabe, Kawasaki (JP); Fumio Futami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/284,242

(22) Filed: Oct. 31, 2002

(65) Prior Publication Data
US 2003/0128414 A1 Jul. 10, 2003

(30) Foreign Application Priority Data
Jan. 9, 2002 (JP) .............................. 2002-002745

(51) Int. Cl.[7] .......................... G02B 26/00; G02F 1/01
(52) U.S. Cl. ..................... 359/239; 359/109; 359/159; 359/337.13; 372/31; 372/96
(58) Field of Search ................................. 359/239, 109, 359/127, 159, 174, 333, 337.13, 337.5; 372/31, 372/26

(56) References Cited

U.S. PATENT DOCUMENTS

| | | | | |
|---|---|---|---|---|
| 4,880,004 A | * | 11/1989 | Baker et al. | .................... 607/4 |
| 5,850,303 A | * | 12/1998 | Yamamoto et al. | ........... 398/91 |
| 6,477,300 B2 | * | 11/2002 | Watanabe et al. | ............. 385/42 |
| 6,498,671 B1 | * | 12/2002 | Janz et al. | .................... 359/237 |
| 6,608,854 B1 | * | 8/2003 | Watanabe | ..................... 372/96 |
| 2001/0021288 A1 | * | 9/2001 | Watanabe et al. | ............. 385/15 |
| 2003/0063860 A1 | * | 4/2003 | Watanabe | ..................... 385/39 |
| 2004/0005153 A1 | * | 1/2004 | Watanabe | ................... 398/148 |

FOREIGN PATENT DOCUMENTS

| | | |
|---|---|---|
| EP | 1 056 173 A2 | 11/2000 |
| EP | 1 130 456 A2 | 9/2001 |
| JP | 08-163047 | 6/1996 |
| JP | 2000-010129 | 1/2000 |
| JP | 2000-321606 | 11/2000 |
| JP | 2000-323786 | 11/2000 |
| JP | 2001-069080 | 3/2001 |
| JP | 2001-117125 | 4/2001 |
| JP | 2001-222037 | 8/2001 |
| WO | WO 00/59139 | 10/2000 |

OTHER PUBLICATIONS

J.C. Simon et al., All-Optical Regeneration, Sep. 20-24, 1998, pp. 467-469, ECOC98, XP002166940.

* cited by examiner

Primary Examiner—Ricky L. Mack
Assistant Examiner—Brandi Thomas
(74) Attorney, Agent, or Firm—Staas & Halsey LLP

(57) ABSTRACT

The method according to the present invention includes the steps of splitting an optical signal into first and second optical signals, increasing the pulse widths of the first optical signal to obtain waveform shaped light, generating clock pulses according to the second optical signal, and inputting the waveform shaped light and the clock pulses into an optical AND circuit 10 to obtain a converted optical signal. According to the present invention, it is possible to suppress amplitude noise or the like generated in the optical AND circuit due to the jitter or temporal instability of the optical signal and the clock pulses.

17 Claims, 5 Drawing Sheets

METHOD AND DEVICE FOR WAVEFORM SHAPING OF SIGNAL LIGHT

BACKGROUND OF THE INVENTION

1. Field of the Invention

The present invention relates to a method and device for waveform shaping of signal light.

2. Description of the Related Art

In an optical fiber communication system that has been put to practical use in recent years, a reduction in signal power due to transmission line loss, coupling loss, etc. is compensated by using an optical amplifier such as an erbium doped fiber amplifier (EDFA). The optical amplifier is an analog amplifier, which functions to linearly amplify a signal. In this kind of optical amplifier, amplified spontaneous emission (ASE) noise generated in association with the amplification is added to cause a reduction in signal-to-noise ratio (S/N ratio), so that the number of repeaters is limited to result in the limit of a transmission distance. Further, waveform degradation due to the chromatic dispersion owned by an optical fiber and the nonlinear optical effects in the fiber is another cause of the transmission limit. To break down such a limit, a regenerative repeater for digitally processing a signal is required, and it is desirable to realize such a regenerative repeater. In particular, an all-optical regenerative repeater capable of performing all kinds of signal processing in optical level is important in realizing a transparent operation independent of the bit rate, pulse shape, etc. of a signal.

The functions required for the all optical regenerative repeater are amplitude restoration or reamplification, waveform shaping or reshaping, and timing restoration or retiming. These functions are referred to as 3R functions, and in particular, the first and second functions are referred to as 2R functions.

An opto-electro-optic (O-E-O) conversion type device and an all-optical type device are known as a device for regenerating an optical signal on the optical level. The O-E-O conversion type device is a device for once converting an optical signal into an electrical signal, next regenerating the electrical signal on the electrical stage, and finally modulating laser light by using the regenerated electrical signal to convert it into an optical signal. On the other hand, the all-optical type device is a device for regenerating an optical signal optically without conversion into an electrical signal. As the O-E-O conversion type device, a device operating at about 10 Gb/s has already been put to practical use. However, since the performance of this device depends on the operating speed of electronics, it is difficult to operate the O-E-O conversion type device at 40 Gb/s or more. On the other hand, the all-optical type device has not yet reached a practical level, but some methods have been proposed.

A Mach-Zehnder interferometer (MZI) type optical gate is known as a typical all-optical waveform shaping device. This optical gate is configured by integrating a Mach-Zehnder interferometer including first and second nonlinear optical media each for providing a phase shift on an optical waveguide substrate, for example. Probe light as continuous wave (CW) light or optical pulses is equally divided into two components, which are in turn supplied to the first and second nonlinear optical media. The optical path length of the interferometer is set so that output light is not obtained by interference of the two components of the probe light.

An optical signal is further supplied to one of the first and second nonlinear optical media. By properly setting the powers of the optical signal and the probe light, a converted optical signal synchronous with the optical signal is output from the optical gate. The converted optical signal has the same wavelength as that of the probe light.

It has been proposed to use a semiconductor optical amplifier (SOA) as each of the first and second nonlinear optical media. For example, an InGaAs SOA having opposite end faces treated with antireflection coatings is used as each nonlinear optical medium in a 1.5 $\mu$m hand, and these nonlinear optical media are integrated on an InP/GaInAsP substrate to fabricate an optical gate. In particular, a type of optical gate called an ultrafast nonlinear interferometer (UNI) has been proposed to improve an operating speed. In this interferometer, the timing of passing of optical pulses through one of the two optical paths is slightly shifted from the timing of passing of optical pulses through the other optical path to thereby improve the limit to the operating speed due to the carrier effect of a semiconductor medium.

A nonlinear optical loop mirror (NOLM) is known as another conventional waveform shaping device. The NOLM includes a first optical coupler having first and second optical paths directionally coupled to each other, a loop optical path for connecting the first and second optical paths, and a second optical coupler having a third optical path directionally coupled to the loop optical path.

By forming a part or the whole of the loop optical path from a nonlinear optical medium and supplying probe light and an optical signal respectively to the first optical path and the third optical path, a converted optical signal is output from the second optical path.

An optical fiber is generally used as the nonlinear optical medium in the NOLM. In particular, a NOLM using a SOA as the nonlinear optical medium is referred to as an SLA-LOM (Semiconductor Laser Amplifier in a Loop Mirror).

By combining a waveform shaping device and an optical clock regenerating (recovery) device, the 3R functions can be provided. In this case, generally, an optical signal to be 3R-regenerated and regenerated optical clock pulses are input into an optical AND circuit, in which data owned by the optical signal is transferred to the regenerated optical clock by the AND operation. The waveform shaping can be effected by locating the waveform shaping device on the front or rear stage of the optical AND circuit, or by making the optical AND circuit have a waveform shaping function.

The 3R functions are conventionally provided by an MZI type optical gate switch as mentioned above, for example. The present inventors have already proposed a waveform shaping device for providing the 2R functions and/or the 3R functions (Japanese Patent Application No. Hei 11-293189). In this device, two NOLMs are combined to thereby increase the degree of freedom of wavelength conversion in the case of obtaining a function of waveform shaping or optical gate.

The waveform shaping device for providing the optical 3R functions has a problem that sufficient 3R functions cannot be obtained in some case according to a relative temporal deviation between the optical signal and the regenerated optical clock pulses input into the optical AND circuit. Such a relative temporal deviation may be caused by the walk-off between the optical signal and the regenerated optical clock pulses in the optical AND circuit or the temporal instability and jitter of each optical pulse, for example.

SUMMARY OF THE INVENTION

It is therefore an object of the present invention to provide a method and device for waveform shaping which can obtain sufficient optical 3R functions.

Other objects of the present invention will become apparent from the following description.

In accordance with an aspect of the present invention, there is provided a method including the steps of splitting an optical signal into first and second optical signals; increasing the pulse widths of the first optical signal to obtain waveform shaped light; generating clock pulses according to the second optical signal; and inputting the waveform shaped light and the clock pulses into an optical AND circuit to obtain a converted optical signal.

In accordance with another aspect of the present invention, there is provided a device including an optical coupler for splitting an optical signal into first and second optical signals; a waveform shaper for increasing the pulse widths of the first optical signal to obtain waveform shaped light; an optical clock regenerator for generating clock pulses according to the second optical signal; and an optical AND circuit for inputting the waveform shaped light and the clock pulses to obtain a converted optical signal.

According to the present invention, it is possible to suppress amplitude noise or the like generated in the optical AND circuit due to the jitter or temporal instability of the optical signal and the clock pulses. Accordingly, optical signal processing such as optical 3R processing, wavelength conversion processing, and optical demultiplexing processing can be stably performed also to an ultrafast signal. Thus, the object of the present invention can be achieved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
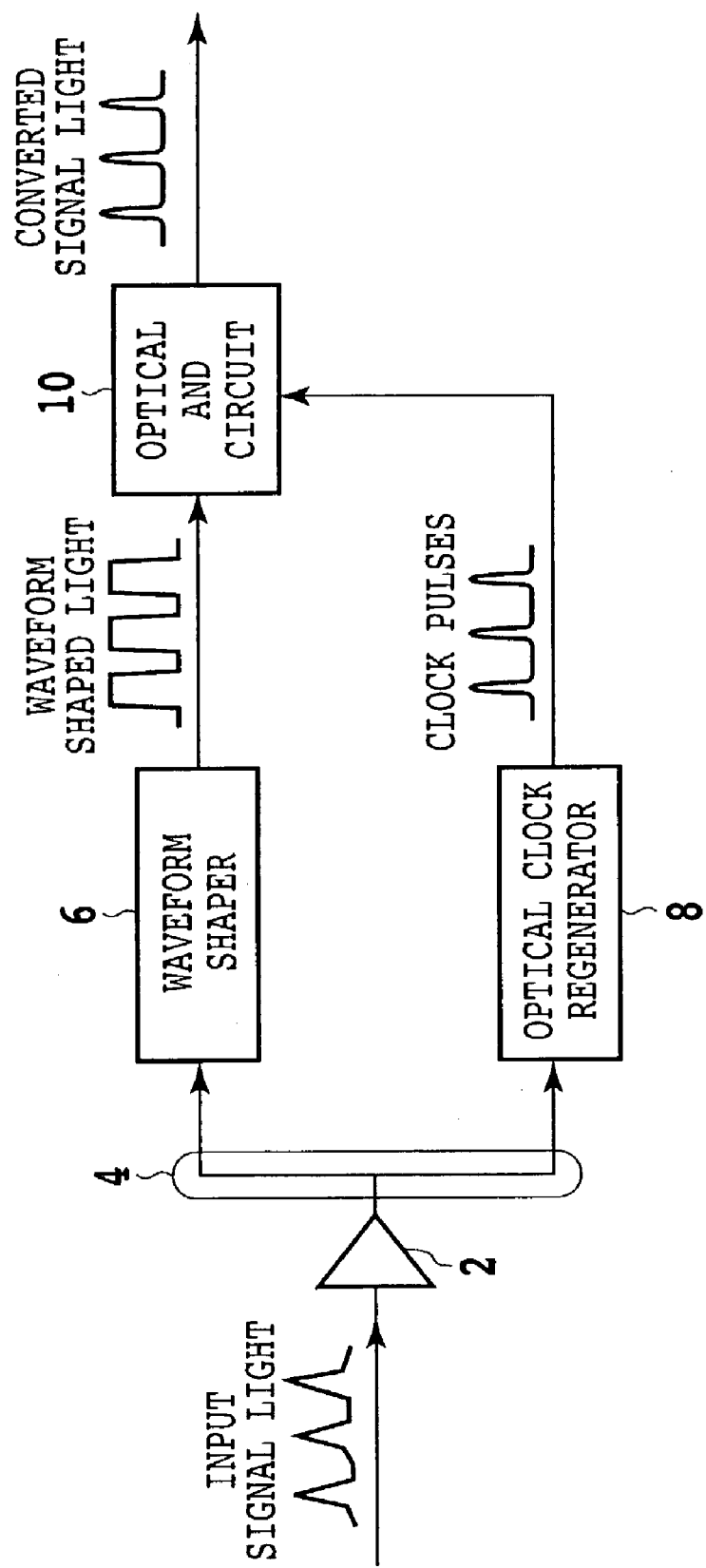
FIG. 1 is a block diagram showing a first preferred embodiment of the device according to the present invention.

Preferred embodiments of the present invention will now be described in detail with reference to the attached drawings. Throughout the drawings, substantially the same or like parts are denoted by the same reference numerals.

FIG. 1 is a block diagram showing a first preferred embodiment of the device according to the present invention. This device includes an optical amplifier 2, an optical coupler 4, a waveform shaper 6, an optical clock regenerator 8, and an optical AND circuit 10.

An optical signal (input signal light) to be waveform shaped is amplified by the optical amplifier 2, and next split into first and second optical signals by the optical coupler 4. The first optical signal is supplied to the waveform shaper 6. In the waveform shaper 6, the pulse widths of the first optical signal are increased to obtain waveform shaped light. The waveform shaped light thus obtained is output from the waveform shaper 6. On the other hand, the second optical signal is supplied to the optical clock regenerator 8. In the optical clock regenerator 8, clock pulses are generated according to the second optical signal. Both the waveform shaped light and the clock pulses are supplied to the optical AND circuit 10. In the optical AND circuit 10, a converted optical signal (converted signal light) is obtained in synchronism with the time during which the waveform shaped light and the clock pulses coexist.

The optical clock regenerator 8 serves to regenerate clock pulses having reference time intervals from signal light disordered in time intervals. For example, in the case of signal light having a speed of 160 Gb/s, a train of pulses having a frequency of 160 GHz arranged at 6.25 ps intervals is regenerated. The generation of clock pulses may be effected by first converting an optical signal into an electrical signal, next retiming the electrical signal, and next oscillating a mode-locked laser (MLL) by using the electrical RF signal. Alternatively, the MLL may be directly oscillated without opto-electric conversion.

However, in the case of a high-speed signal as of 160 Gb/s, the signal speed exceeds the limit of the operating speed in electronics, and the realization of the MLL operating at such a high speed is also difficult. Accordingly, it is preferable to regenerate a pulse train of lower speed such as 10 GHz and next generate clock pulses of 160 GHz by using OTDM (optical time division multiplexing).

Figure 2:
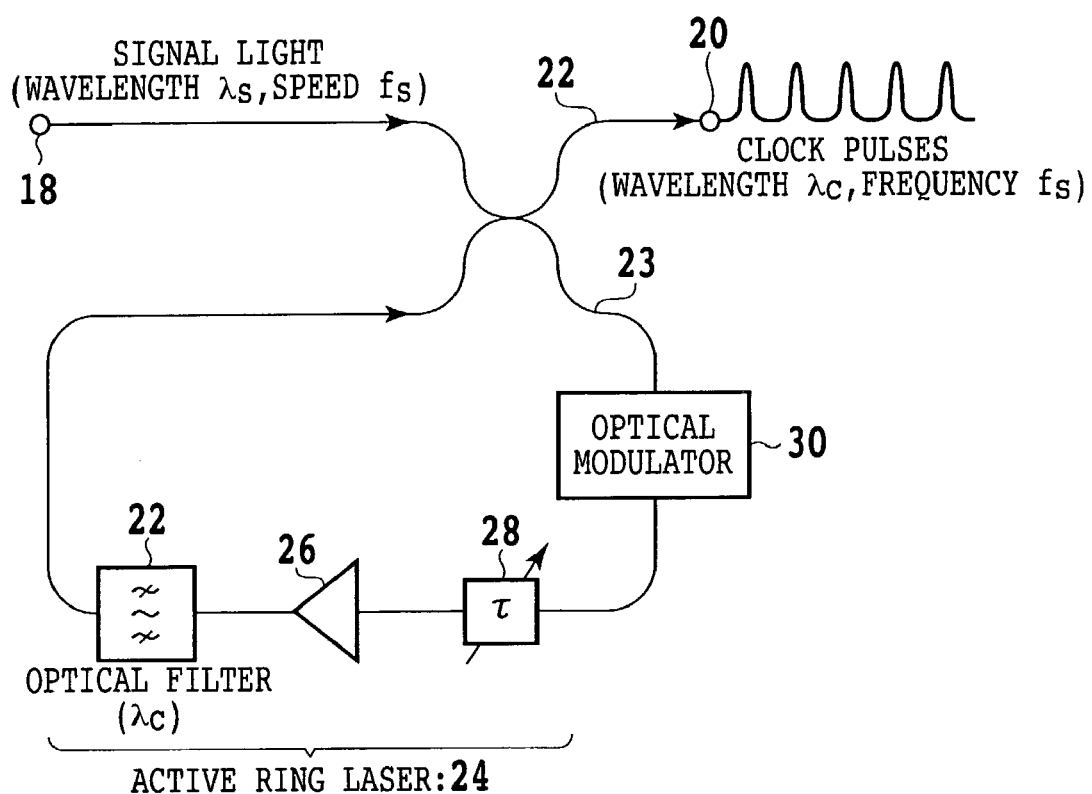
FIG. 2 is a block diagram showing a preferred embodiment of the optical clock regenerator 8 shown in FIG. 1.

FIG. 2 is a block diagram showing a preferred embodiment of the optical clock regenerator 8 shown in FIG. 1. This clock regenerator includes an optical path 22 provided between an input port 18 and an output port 20, and an active ring laser 24 having an optical loop 23 optically coupled (e.g., directionally coupled) to the optical path 22.

Signal light (second optical signal) having a wavelength $\lambda_s$ and a speed $f_s$ is supplied to the input port 18. The active ring laser 24 includes an optical amplifier 26 for compensating loss in the optical loop 23 so that laser oscillation occurs in the optical loop 23, an adjuster 28 for adjusting the optical path length of the optical loop 23 so that the speed (or frequency) $f_s$ becomes equal to an integral multiple of the reciprocal of a recirculation period of the optical loop 23, and an optical modulator (or nonlinear optical medium) 30 for mode-locking the laser oscillation according to the signal light. The active ring laser 24 may further include an optical bandpass filter 32 having a pass band including the wavelength $\lambda_c$ of the laser oscillation.

With this configuration, the laser oscillation of the active ring laser 24 is mode-locked, so that clock pulses having the wavelength $\lambda_c$ and the frequency $f_s$ are generated and output from the output port 20. Accordingly, clock pulses can be obtained without the need for opto/electric conversion, and it is possible to provide an all-optical clock regenerator insensitive to the speed and pulse shape of signal light.

The optical modulator 30 may be provided by an electro/optic modulator such as a $LiNbO_3$ intensity modulator and an EA (electroabsorption) modulator. Alternatively, a modulation method using second-order or third-order nonlinear optical effects or cross gain modulation may be adopted. For example, in the case of using four-wave mixing in an optical fiber, the wavelength $\lambda_s$ of signal light is set to a wavelength near the zero-dispersion wavelength of the fiber to effectively amplitude-modulate continuously oscillated light, thereby generating clock pulses. In the case of using a semiconductor optical amplifier (SOA), signal light can be used as pump light. In the case of using four-wave mixing in a DFB-LD in its oscillating state, the wavelength of signal light is set to a wavelength different from the wavelength of oscillated light in the DFB-LD, and this signal light is input with a relatively high power to induce gain saturation, thereby modulating the efficiency of four-wave mixing. Further, the continuously oscillated light can be effectively amplitude-modulated by a cross gain modulation (XGM) effect. This effect of XGM is exhibited also in the case of using four-wave mixing in an SOA, so that XGM may be positively used.

Also in the case of using second-order nonlinear optical effects, substantially the same effect can be obtained by using signal light as pump light. On the other hand, in the case of using cross phase modulation (XPM), amplitude modulation can be generated by using polarization fluctuations due to phase modulation, for example.

Prior to description of the operation of the waveform shaper 6, there will now be examined a case where such waveform shaping is not performed. Since the signal light is temporally disordered, it includes a portion synchronized with the clock pulses and a portion slightly shifted from the clock pulses in the optical AND circuit 10. For example, in the case of using a high-speed optical switch such as a NOLM (nonlinear optical loop mirror) as the optical AND circuit 10, the amplitude of the resultant converted light is not constant because of the above temporal shift. Accordingly, if the cause of the temporal shift is a noisy one such as jitter, amplitude noise is added to the converted light.

To avoid the addition of such noise, the pulse shapes of the signal light to be input into the optical AND circuit 10 are made rectangular in the present invention. Accordingly, the optical AND operation between the signal light and the clock pulses can be always effected within the width of each rectangular pulse, so that the addition of amplitude noise as mentioned above can be suppressed to thereby reduce the noise such as jitter.

Figure 3:
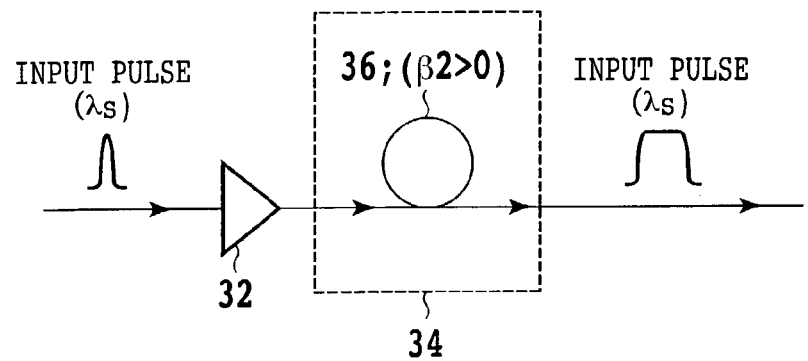
FIG. 3 is a block diagram showing a preferred embodiment of the waveform shaper 6 shown in FIG. 1.

FIG. 3 is a block diagram showing a preferred embodiment of the waveform shaper 6 shown in FIG. 1. An optical fiber 36 is used as an optical waveguide structure 34 for providing nonlinear optical effects. The GVD (group velocity dispersion) of the optical fiber 36 is $\beta_2$, and the optical fiber 36 gives normal dispersion and third-order nonlinear optical effects to an optical signal supplied.

An input pulse (first optical signal) having a center wavelength $\lambda_s$ is amplified by an optical amplifier 32 to obtain a power enough to generate required chirping, and next input into the optical fiber 36. In the optical fiber 36, chirping is induced by SPM (self phase modulation) to thereby broaden (diffuse) the spectrum.

In the optical fiber 36, the chirp is induced by SPM, so that the leading edge of the optical pulse shifts toward the longer wavelengths, and the trailing edge of the optical pulse shifts toward the shorter wavelengths. For example, in the case that the optical fiber 36 is a normal-dispersion fiber, the GVD increases with an increase in wavelength. Accordingly, the width of the optical pulse is increased by the above chirp. The optical pulse can be broadened rectangularly by suitably increasing the dispersion of the optical fiber so as to rapidly change the waveform in a short time and by inputting to the optical fiber a high-power optical pulse whose leading and trailing edges are as steep as possible.

In actual, the third-order nonlinear optical effects are finite and some degree of fiber length is therefore necessary. Pulse broadening due to only chromatic dispersion rather than pulse broadening due to the chirp mentioned above occurs especially at the tail of an optical pulse where the nonlinear effects are relatively small. In such a case, a dispersion compensator is preferably located at the output end of the optical fiber, so as to compensate for the broadening due to the chromatic dispersion and thereby obtain an optical pulse having a nearly desired shape. For example, by using an optical fiber having a dispersion opposite in sign to the dispersion of the normal-dispersion fiber as the dispersion compensator, the dispersion of the normal-dispersion fiber can be effectively compensated. The value of dispersion of the optical fiber and the amount of compensation by the optical fiber as the dispersion compensator may be suitably adjusted according to the conditions of the input optical pulse and the optical fiber to be used.

Additional information on the spectral broadening using a normal-dispersion fiber is described in detail in Japanese Patent Application No. 2000-34454, for example, which is incorporated herein by reference.

Figure 4:
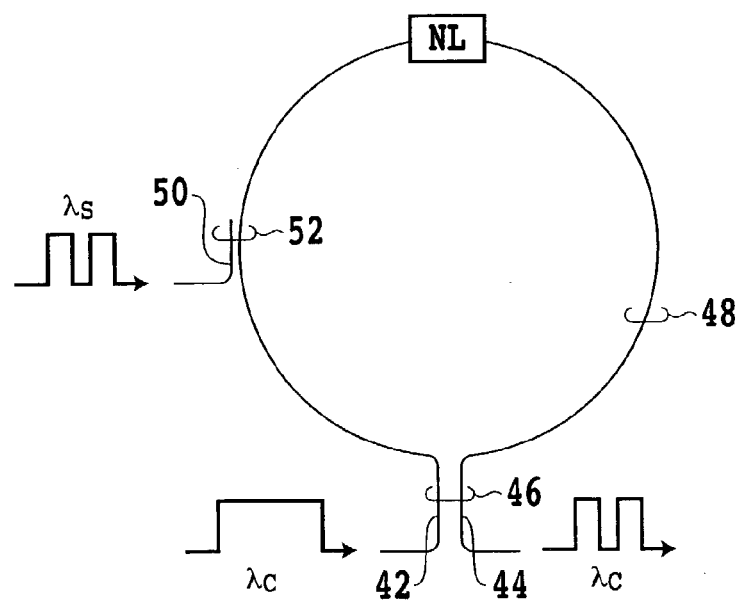
FIG. 4 is a block diagram showing a NOLM applicable to the present invention.

Referring to FIG. 4, there is shown a configuration of a NOLM (nonlinear optical loop mirror) applicable to the present invention. This NOLM may be used as the optical AND circuit 10 shown in FIG. 1.

This NOLM includes a first optical coupler 46 having first and second optical paths 42 and 44 directionally coupled to each other, a loop optical path 48 for connecting the first and second optical paths 42 and 44, and a second optical coupler 52 having a third optical path 50 directionally coupled to the loop optical path 48.

A part or the whole of the loop optical path 48 is provided by a nonlinear optical medium NL. The coupling ratio of the first optical coupler 46 is set substantially to 1:1.

The operation of this NOLM will now be described in brief. When probe light having a wavelength $\lambda_c$ is input into the first optical path 42 of the optical coupler 46 and an optical signal having a wavelength $\lambda_c$ is input into the third optical path 50 of the optical coupler 52, a converted optical signal having a wavelength $\lambda_c$ is output from the second optical path 44 of the optical coupler 46. The probe light may be continuous-wave (CW) light or optical pulses. In this example shown, the probe light is CW light.

The probe light is divided into two components having the same power by the optical coupler 46. The two components propagate in the loop optical path 48 clockwise and counterclockwise, respectively, with exactly the same optical path length, and are next subjected to a phase shift $\phi$ for each by the nonlinear optical medium NL. Thereafter, they are combined by the optical coupler 46. In combining these components at the optical coupler 46, they are equal in power and phase to each other, so that resultant light obtained by this combination is output from the first optical path 42 but not output from the second optical path 44 as if it is reflected by a mirror.

When an optical signal is input from the middle of the loop optical path 48 by the optical coupler 52, this optical signal propagates in the loop optical path 48 in only one direction thereof (e.g., clockwise in FIG. 4), and the nonlinear refractive index of the nonlinear optical medium NL changes for the light propagating in this direction only when on-pulses pass therethrough. Accordingly, in combining the two components of the probe light at the optical coupler 46, the phases of the two components of the probe light at their portions synchronous with off-pulses of the optical signal are coincident with each other, and the phases of the two components of the probe light at their portions synchronous with on-pulses of the optical signal are different from each other. Letting $\Delta\phi$ denote a phase difference in the latter case, an output proportional to $[1-\cos(\Delta\phi)]$ is obtained from the second optical path 44 of the optical coupler 46.

By setting the power of the input optical signal so that the phase difference becomes $\pi$, it is possible to perform a switching operation such that the two components combined upon passing of the on-pulses are output only from the second optical path 44. Thus, the conversion from the optical signal having the wavelength $\lambda_s$ into the converted optical signal having the wavelength $\lambda_c$ is performed. That is, wavelength conversion is performed on the data of the optical signal Assuming that an optical Kerr effect (cross-phase modulation (XPM) by the optical signal and the probe light) is used as the nonlinear optical effect, the phase shift $\Delta\phi$ is proportional to $\gamma PL$, where $\gamma$ is the nonlinear coefficient of the nonlinear optical medium NL, P is the optical power in the nonlinear optical medium NL, and L is the length of interaction of the optical Kerr effect in the nonlinear optical medium NL.

While the optical AND operation described above is performed in the case of different wavelengths, the preferred embodiment shown in FIG. 1 is not limited to this case.

Other examples of the optical AND circuit 10 include a Mach-Zehnder interferometer type optical gate and an optical mixing type switch using four-wave mixing or difference-frequency generation.

In the first preferred embodiment, waveform shaping for increasing the pulse widths of input signal light from a transmission line (specifically, control for increasing the pulse widths in such a range that no crosstalk with an adjacent pulse occurs during one time slot or less of input signal light) is carried out on the front stage of the optical AND circuit 10, thereby resolving the phase jitter occurring in obtaining AND between the input signal light pulses and the regenerated optical clock pulses in the optical AND circuit 10.

Figure 5:
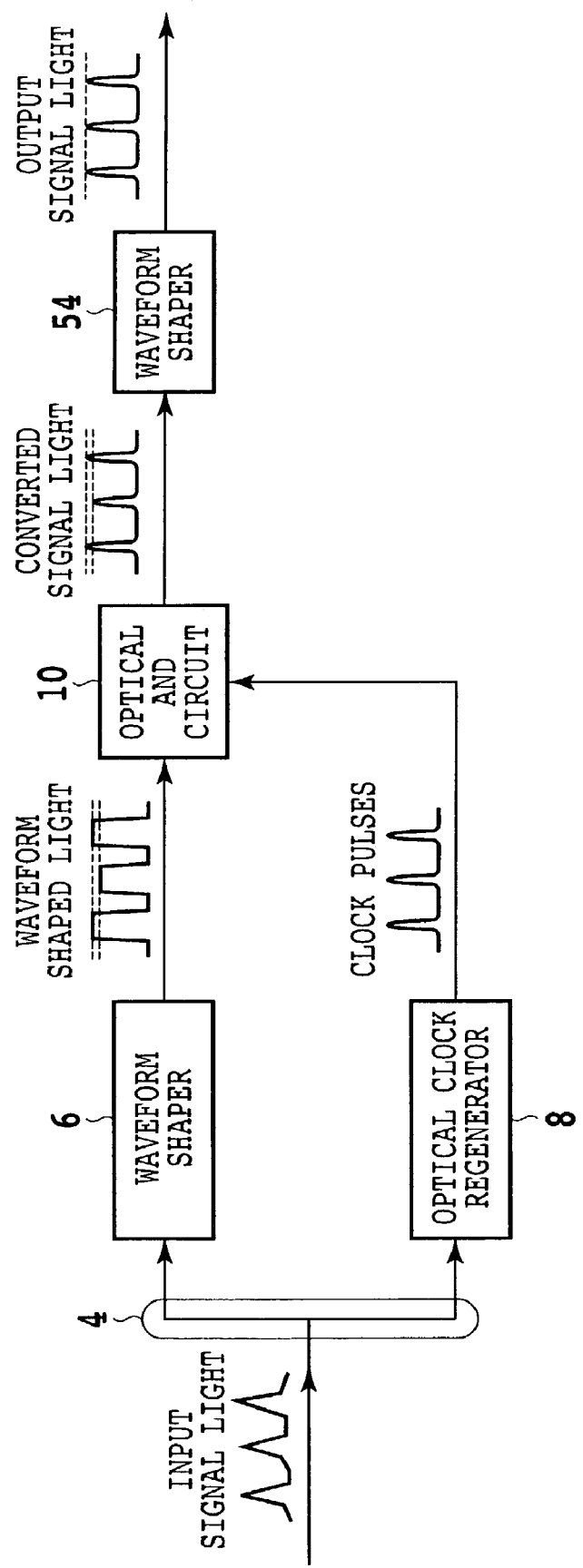
FIG. 5 is a block diagram showing a second preferred embodiment of the device according to the present invention.

FIG. 5 is a block diagram showing a second preferred embodiment of the device according to the present invention. In contrast to the preferred embodiment shown in FIG. 1, the preferred embodiment shown in FIG. 5 is characterized in that a second waveform shaper 54 is provided on the output side of the optical AND circuit 10. Although not shown in FIG. 5, the optical amplifier 2 is provided on the input side of the optical coupler 4. The second waveform shaper 54 is provided to further suppress amplitude fluctuations of the converted signal light output from the optical AND circuit 10 and to output the resultant converted signal light as output signal light.

Figure 6:
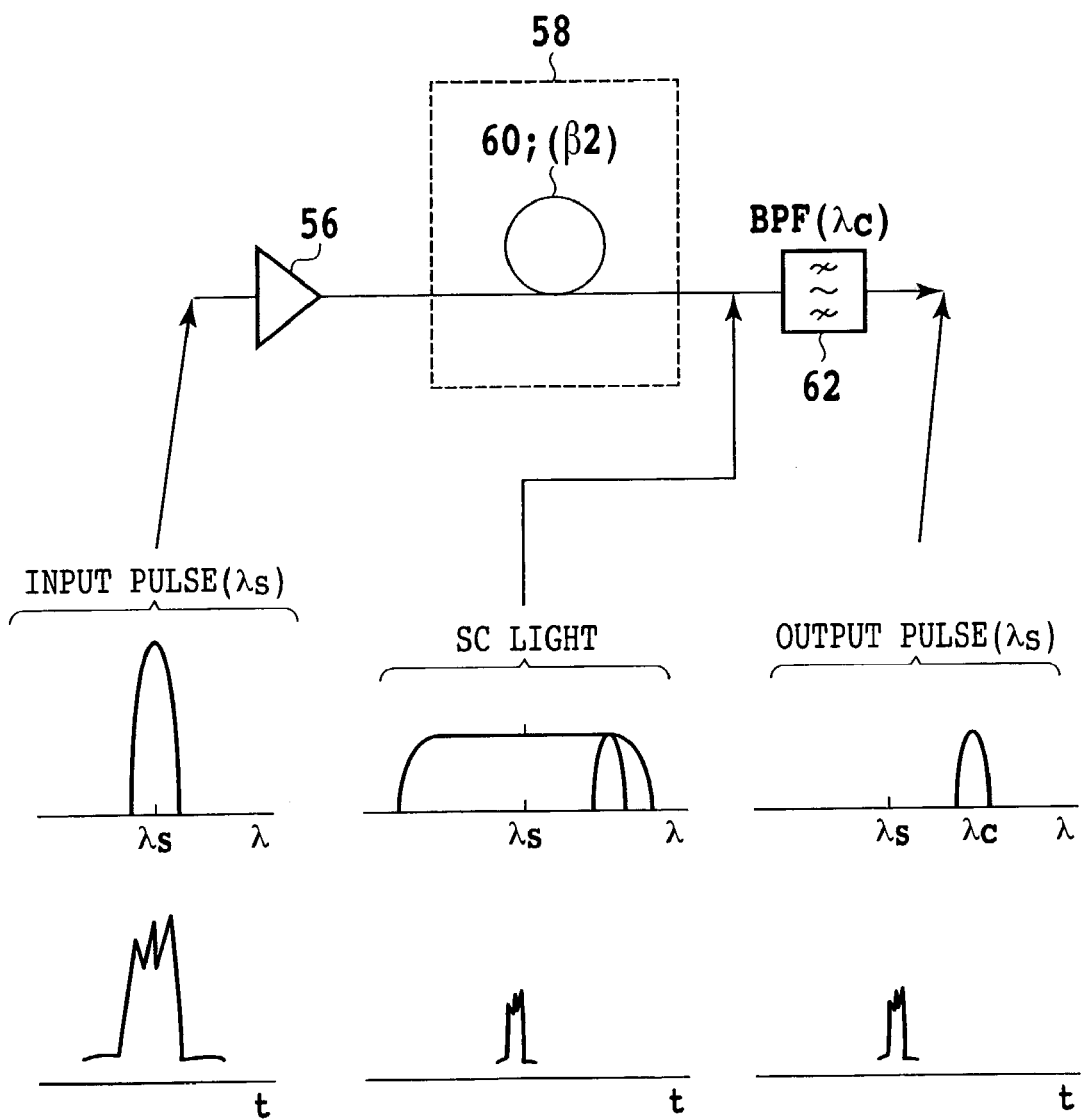
FIG. 6 is a block diagram showing a preferred embodiment of the second waveform shaper 54 shown in FIG.

FIG. 6 is a block diagram showing a preferred embodiment of the second waveform shaper 59 shown in FIG. 5. An optical fiber 60 is used as an optical waveguide structure 58 for providing nonlinear optical effects. The GVD of the optical fiber 60 is $\beta_2$, and the optical fiber 60 gives normal dispersion and third-order nonlinear optical effects to an optical signal supplied.

Input signal light (converted signal light) having a center wavelength $\lambda_s$ is amplified by an optical amplifier 56 to obtain a power enough to generate required chirping, and next input into the optical fiber 60 for generating light (supercontinuum light) having a constant amplitude and a spectrum wider than the spectrum of the original light. In the optical fiber 60, chirping is induced by SPM to thereby convert the original light into the supercontinuum light (SC light) whose spectrum is broadened (diffused). The chirped optical signal output from the optical fiber 60 is supplied to an optical bandpass filter (BPF) 62 having a passband whose center wavelength is $\lambda_c$. In the BPF 62, a component of the input optical signal except a small-chirp component is extracted to obtain an output pulse having the center wavelength $\lambda_c$.

The small-chirp component mainly includes fluctuations in off-power (bit 0) component from a zero point (e.g., waveform degradation due to GVD) and a small-slope component near the peak of the pulse. These components determine an optical signal-to-noise ratio (OSNR). Accordingly, by removing these components by the use of the BPF 62, it is possible to suppress a reduction in OSNR due to the power fluctuations, extinction ratio degradation, noise accumulation, etc. of these components. Thus, according to the present invention, wavelength conversion and clock pulse extraction can be realized with the improved OSNR.

It is preferable to sufficiently space the center wavelength $\lambda_c$ in the passband of the BPF 62 from the center wavelength $\lambda_s$ of the signal pulse so that the small-chirp component having noise is not included in the output signal pulse (in order to avoid that a large-amplitude portion may come at the wavelength of the signal pulse). Further, it is preferable to suitably set the width and shape of the passband of the BPF 62 according to the width and shape of a pulse required. Basically, the width and shape of the passband of the BPF 62 are set substantially equal to those of the spectrum of the input signal pulse.

Additional information on this method is described In detail in Japanese Patent Application Nos. 2000-264757 and 2000-301952, which are incorporated herein by reference. Further, a highly nonlinear fiber or a photonic crystal fiber (Holey Fiber) is suitable for the optical fiber 60 as the optical waveguide structure 58 for providing nonlinear optical effects.

By performing waveform shaping for increasing the pulse widths of the input signal light on the rear stage of the optical AND circuit 10 in the second preferred embodiment, it is possible to solve the problem that the amplitude of light regenerated in the optical AND circuit 10 may vary because of the pulse broadening control in the optical transmission line or on the front stage of the optical AND circuit 10 and because of the amplitude noise generated in the optical AND circuit 10.

While the second preferred embodiment has been described under the condition that the first preferred embodiment is used, the waveform shaper on the rear stage of the optical AND circuit in the second preferred embodiment is effective to amplitude fluctuations of the output light from the optical AND circuit, and it is not limited by the circuit configuration on the front stage of the optical AND circuit.

Further, while the supercontinuum light is generated in the optical her 60 having nonlinear effects in the second preferred embodiment, any optical media other than the optical fiber may be used provided that the media can generate supercontinuum light.

According to the present invention as described above, it is possible to provide a method and device for waveform shaping which can obtain sufficient 2R and/or 3R functions.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising:
splitting an optical signal into first and second optical signals;
increasing the pulse widths of the first optical signal to a high level to obtain waveform shaped light with a constant amplitude at said high level;
generating clock pulses according to the second optical signal; and
inputting the waveform shaped light and the clock pulses into an optical AND circuit to obtain a converted optical signal.

2. A method according to claim 1, further comprising suppressing amplitude fluctuations of the converted optical signal.

3. A method according to claim 1, wherein the obtaining the waveform shaped light includes inputting the first optical signal into an optical waveguide structure for providing nonlinear optical effects.

4. A method according to claim 3, wherein the optical waveguide structure is an optical fiber providing normal dispersion.

5. A method according to claim 3, further comprising amplifying the first optical signal to be input into the optical waveguide structure.

6. A method according to claim 1, wherein the optical AND circuit outputs the converted optical signal in synchronism with the time during which the waveform shaped light and the clock pulses coexist.

7. A device comprising:
an optical coupler splitting an optical signal into first and second optical signals;
a waveform shaper increasing the pulse widths of the first optical signal to a high level to obtain waveform shaped light with a constant amplitude at said high level;
an optical clock regenerator for generating clock pulses according to the second optical signal; and
an optical AND circuit inputting the waveform shaped light with a constant amplitude at said high level and the clock pulses to obtain a converted optical signal.

8. A device according to claim 7, further comprising a second waveform shaper suppressing amplitude fluctuations of the converted optical signal.

9. A device according to claim 7, wherein the waveform shaper includes an optical waveguide structure providing nonlinear effects, and the first optical signal is input into the optical waveguide structure.

10. A device according to claim 9, wherein the optical waveguide structure is an optical fiber for providing normal dispersion.

11. A device according to claim 10, further comprising a dispersion compensator provided on the rear stage of the optical fiber and compensating the dispersion of the optical fiber, wherein light output from the optical fiber is input into the dispersion compensator.

12. A device according to claim 11, wherein the dispersion compensator includes a second optical fiber having a dispersion opposite in sign to the dispersion of the optical fiber.

13. A device according to claim 9, further comprising an optical amplifier amplifying the first optical signal to be input into the optical waveguide structure.

14. A device according to claim 7, wherein the optical AND circuit outputs the converted optical signal in synchronism with the time during which the waveform shaped light and the clock pulses coexist.

15. A device comprising:
optical splitting means for splitting light into first and second lights;
an optical clock regenerator for generating optical clock pulses according to the second light;
an optical AND circuit for inputting the first light and the optical clock pulses to obtain a converted optical signal; and
a waveform shaper broadening the spectrum of the converted optical signal with a constant amplitude.

16. A method comprising:
splitting light into first and second lights;
generating optical clock pulses according to the second light;
inputting the first light and the optical clock pulses into an optical AND circuit to obtain a converted optical signal; and
broadening the spectrum of the converted optical signal with a constant amplitude.

17. A device comprising:
optical splitting means for splitting light into first and second lights;
a first waveform shaper increasing the pulse widths of the first light to obtain waveform shaped light;
an optical clock regenerator generating optical clock pulses according to the second light;
an optical AND circuit inputting the waveform shaped light and the optical clock pulses to obtain a converted optical signal; and
a second waveform shaper broadening the spectrum of the converted optical signal with a constant amplitude.

* * * * *